US006184491B1

(12) United States Patent
Crane et al.

(10) Patent No.: US 6,184,491 B1
(45) Date of Patent: Feb. 6, 2001

(54) METHOD AND APPARATUS FOR MONITORING WELD QUALITY

(75) Inventors: Bryan L. Crane, Cambridge, MA (US); Alan L. Kilty, Peoria; Howard W. Ludewig, Groveland, both of IL (US); Brett A. Jones, San Pedro (MX)

(73) Assignee: Caterpillar Inc., Peoria, IL (US)

( * ) Notice: Under 35 U.S.C. 154(b), the term of this patent shall be extended for 0 days.

(21) Appl. No.: 09/433,181

(22) Filed: Nov. 3, 1999

(51) Int. Cl.[7] .................................................... B23K 9/095
(52) U.S. Cl. .................................................... 219/130.01
(58) Field of Search ......................... 219/130.01, 137 PS, 219/130.21, 124.34

(56) References Cited

U.S. PATENT DOCUMENTS 4,103,141 7/1978 Wristen .
4,447,700 5/1984 Cohen .
4,454,408 6/1984 Kajiwara et al. .
4,605,836 8/1986 Retfalvi et al. .
4,613,743 9/1986 Nied et al. .
4,694,135 9/1987 Nagel et al. .
4,711,984 12/1987 Bilge et al. .
4,728,768 3/1988 Cueman .
4,804,811 2/1989 Raycher et al. .
4,861,960 8/1989 Haefner et al. .
5,306,893 * 4/1994 Morris et al. .................. 219/130.01
5,369,243 11/1994 Kramer et al. .
5,521,354 * 5/1996 Ludewig et al. ................ 219/130.01
5,571,431 11/1996 Lantieri et al. .
5,601,739 2/1997 Okumura et al. .
5,601,741 2/1997 Thommes .
5,708,253 1/1998 Bloch et al. .
5,750,957 5/1998 Kilty et al. .
5,756,962 5/1998 James et al. .

* cited by examiner

*Primary Examiner*—Clifford C. Shaw
(74) *Attorney, Agent, or Firm*—Kevin M. Kercher

(57) ABSTRACT

A method and apparatus for monitoring quality of a weld bead during a welding process utilizing an electronic controller is disclosed. The method and apparatus includes determining an average power spectral density value for a first welding parameter signal between a first predetermined frequency and a second predetermined frequency, determining an average power spectral density value for a second welding parameter signal between a first predetermined frequency and a second predetermined frequency, and comparing the average power spectral density value for the second welding parameter signal with the average power spectral density value for the first welding parameter signal and terminating the welding process if the average power spectral density value for the first welding parameter signal exceeds the average power spectral density value for the second welding parameter signal.

32 Claims, 4 Drawing Sheets

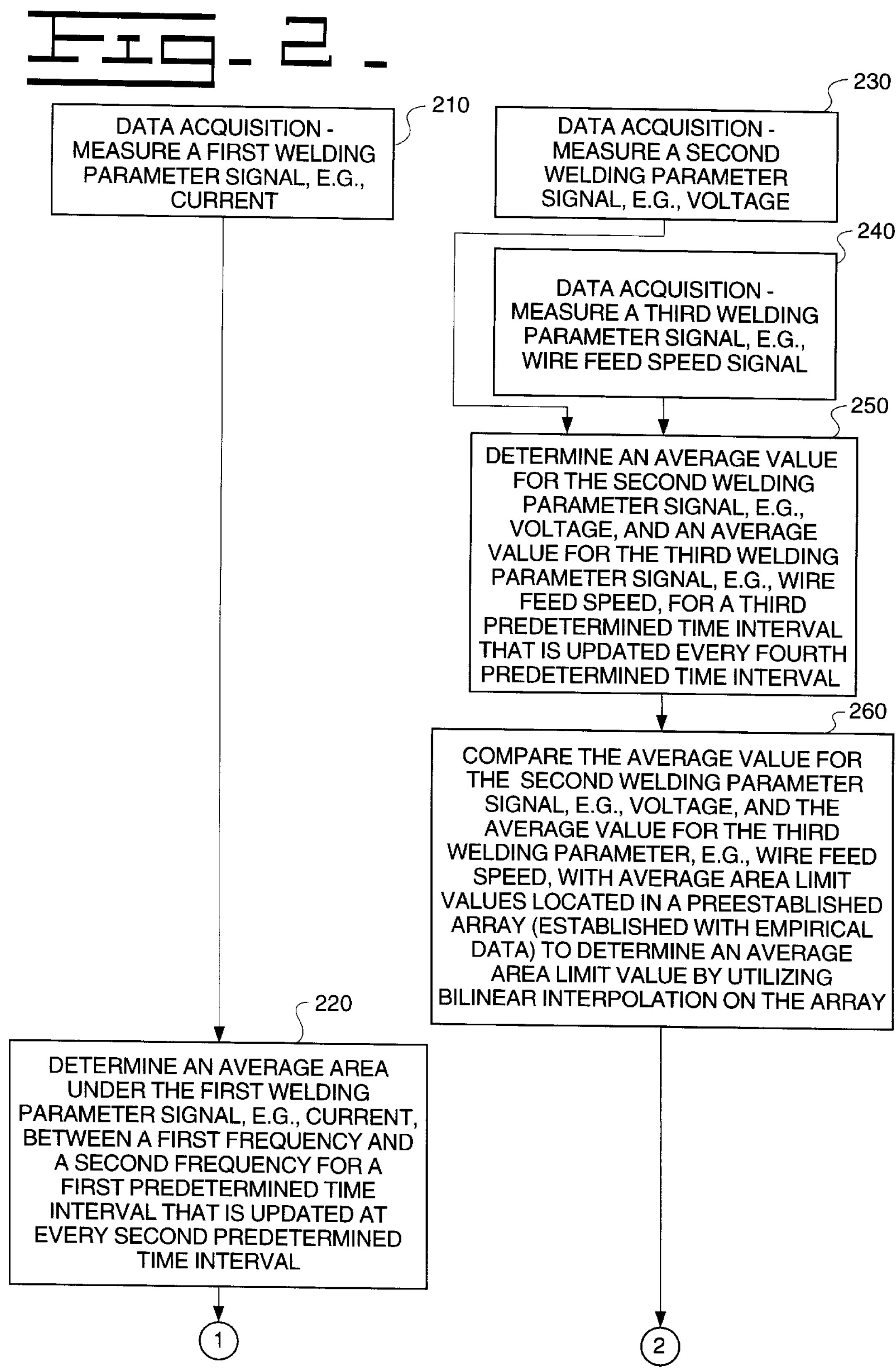
Fig. 2
210
DATA ACQUISITION - MEASURE A FIRST WELDING PARAMETER SIGNAL, E.G., CURRENT
230
DATA ACQUISITION - MEASURE A SECOND WELDING PARAMETER SIGNAL, E.G., VOLTAGE
240
DATA ACQUISITION - MEASURE A THIRD WELDING PARAMETER SIGNAL, E.G., WIRE FEED SPEED SIGNAL
250
DETERMINE AN AVERAGE VALUE FOR THE SECOND WELDING PARAMETER SIGNAL, E.G., VOLTAGE, AND AN AVERAGE VALUE FOR THE THIRD WELDING PARAMETER SIGNAL, E.G., WIRE FEED SPEED, FOR A THIRD PREDETERMINED TIME INTERVAL THAT IS UPDATED EVERY FOURTH PREDETERMINED TIME INTERVAL
260
COMPARE THE AVERAGE VALUE FOR THE SECOND WELDING PARAMETER SIGNAL, E.G., VOLTAGE, AND THE AVERAGE VALUE FOR THE THIRD WELDING PARAMETER, E.G., WIRE FEED SPEED, WITH AVERAGE AREA LIMIT VALUES LOCATED IN A PREESTABLISHED ARRAY (ESTABLISHED WITH EMPIRICAL DATA) TO DETERMINE AN AVERAGE AREA LIMIT VALUE BY UTILIZING BILINEAR INTERPOLATION ON THE ARRAY
220
DETERMINE AN AVERAGE AREA UNDER THE FIRST WELDING PARAMETER SIGNAL, E.G., CURRENT, BETWEEN A FIRST FREQUENCY AND A SECOND FREQUENCY FOR A FIRST PREDETERMINED TIME INTERVAL THAT IS UPDATED AT EVERY SECOND PREDETERMINED TIME INTERVAL
1
2

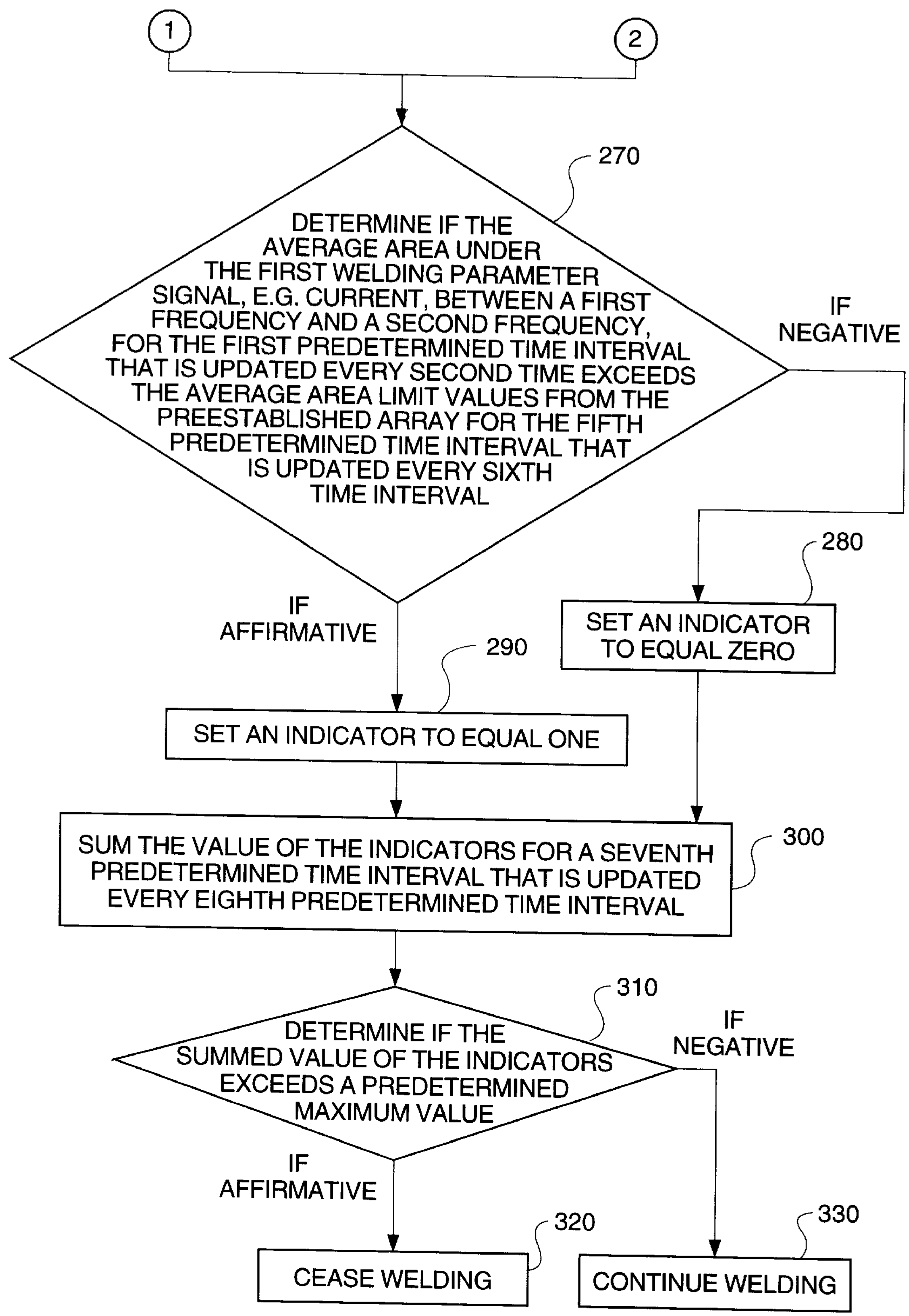
Fig-2a-
1
2
270
DETERMINE IF THE AVERAGE AREA UNDER THE FIRST WELDING PARAMETER SIGNAL, E.G. CURRENT, BETWEEN A FIRST FREQUENCY AND A SECOND FREQUENCY, FOR THE FIRST PREDETERMINED TIME INTERVAL THAT IS UPDATED EVERY SECOND TIME EXCEEDS THE AVERAGE AREA LIMIT VALUES FROM THE PREESTABLISHED ARRAY FOR THE FIFTH PREDETERMINED TIME INTERVAL THAT IS UPDATED EVERY SIXTH TIME INTERVAL
IF NEGATIVE
280
SET AN INDICATOR TO EQUAL ZERO
IF AFFIRMATIVE
290
SET AN INDICATOR TO EQUAL ONE
300
SUM THE VALUE OF THE INDICATORS FOR A SEVENTH PREDETERMINED TIME INTERVAL THAT IS UPDATED EVERY EIGHTH PREDETERMINED TIME INTERVAL
310
DETERMINE IF THE SUMMED VALUE OF THE INDICATORS EXCEEDS A PREDETERMINED MAXIMUM VALUE
IF NEGATIVE
IF AFFIRMATIVE
320
CEASE WELDING
330
CONTINUE WELDING

METHOD AND APPARATUS FOR MONITORING WELD QUALITY

TECHNICAL FIELD

This invention relates generally to a method and apparatus for determining quality of an arc welding process in real time and, more particularly, to a method and apparatus for utilizing welding parameter signals such as, but not limited to, current, voltage, and wire feed speed and determining if defects are being formed in a weld bead.

BACKGROUND ART

In general, gas metal arc welding is defined as an arc welding process in which an electrical arc is established between a consumable electrode, such as a wire, and a base metal to be welded. Droplets are formed on the tip of the molten electrode, e.g., wire, and are transferred across the arc. There is an inert or slightly reactive shielding gas that is provided in the arc region to reduce the reaction of the base metal, molten electrode, and the arc that is due to contamination with the atmosphere. A constant voltage/potential power source is utilized to maintain welding voltage invariable at a particular electrode feed speed. The disturbances in the arc region such as shielding gas contamination that can form porosity, weld pool interference, and excessive melt-through can be detected in the current and voltage signals as the power source compensates for these events. Similar types of welding can also include flux core welding and submerged arc welding.

Prior welding strategies measure variations in welding current signals and welding voltage signals in order to track a weld seam, adjust fill volume, or detect shielding gas contamination. In addition, short circuits can be detected as well as pulse frequency in the sampled electrical signals. Another method for detecting weld quality problems is disclosed in U.S. Pat. No. 5,750,957, which issued on May 12, 1998. The method includes determinations based on the standard deviation of the electrical signal, the summed power spectrum of the electrical signal, and/or the average absolute value of the time derivative of the electrical signal and requires a minimum threshold limit.

The present invention is directed to overcoming one or more of the problems set forth above.

DISCLOSURE OF THE INVENTION

In one aspect of this invention, a method for monitoring quality of a weld bead during a welding process utilizing an electronic controller is disclosed. The method includes the steps of determining an average power spectral density value for a first welding parameter signal between a first predetermined frequency and a second predetermined frequency, determining an average power spectral density value for a second welding parameter signal between a first predetermined frequency and a second predetermined frequency and comparing said average power spectral density value for said second welding parameter signal with said average power spectral density value for said first welding parameter signal and terminating said welding process if said average power spectral density value for said first welding parameter signal exceeds said average power spectral density value for said second welding parameter signal.

In another aspect of this invention, an apparatus for monitoring quality of a weld bead during a welding process is disclosed. The apparatus includes an electronic controller for receiving a first welding parameter signal and a second welding parameter signal and then determining an average power spectral density value for said first welding parameter signal between a first predetermined frequency and a second predetermined frequency and determining an average power spectral density value for said second welding parameter signal area between a first predetermined frequency and a second predetermined frequency and then comparing said average power spectral density value for said second welding parameter signal with said average power spectral density value for said first welding parameter signal and terminating said welding process if said average power spectral density value for said first welding parameter signal exceeds said average power spectral density value for said second welding parameter signal.

BRIEF DESCRIPTION OF THE DRAWINGS

For a better understanding of the present invention, reference may be made to the accompanying drawings in which:

FIGS. 2 and 2A are a flow chart of a main algorithm of the preferred embodiment of the present invention for determining average area under a first welding parameter signal and comparing this value to a combination average area limit value for both a second welding parameter signal and a third welding parameter signal.

BEST MODE FOR CARRYING OUT THE INVENTION

Figure 1:
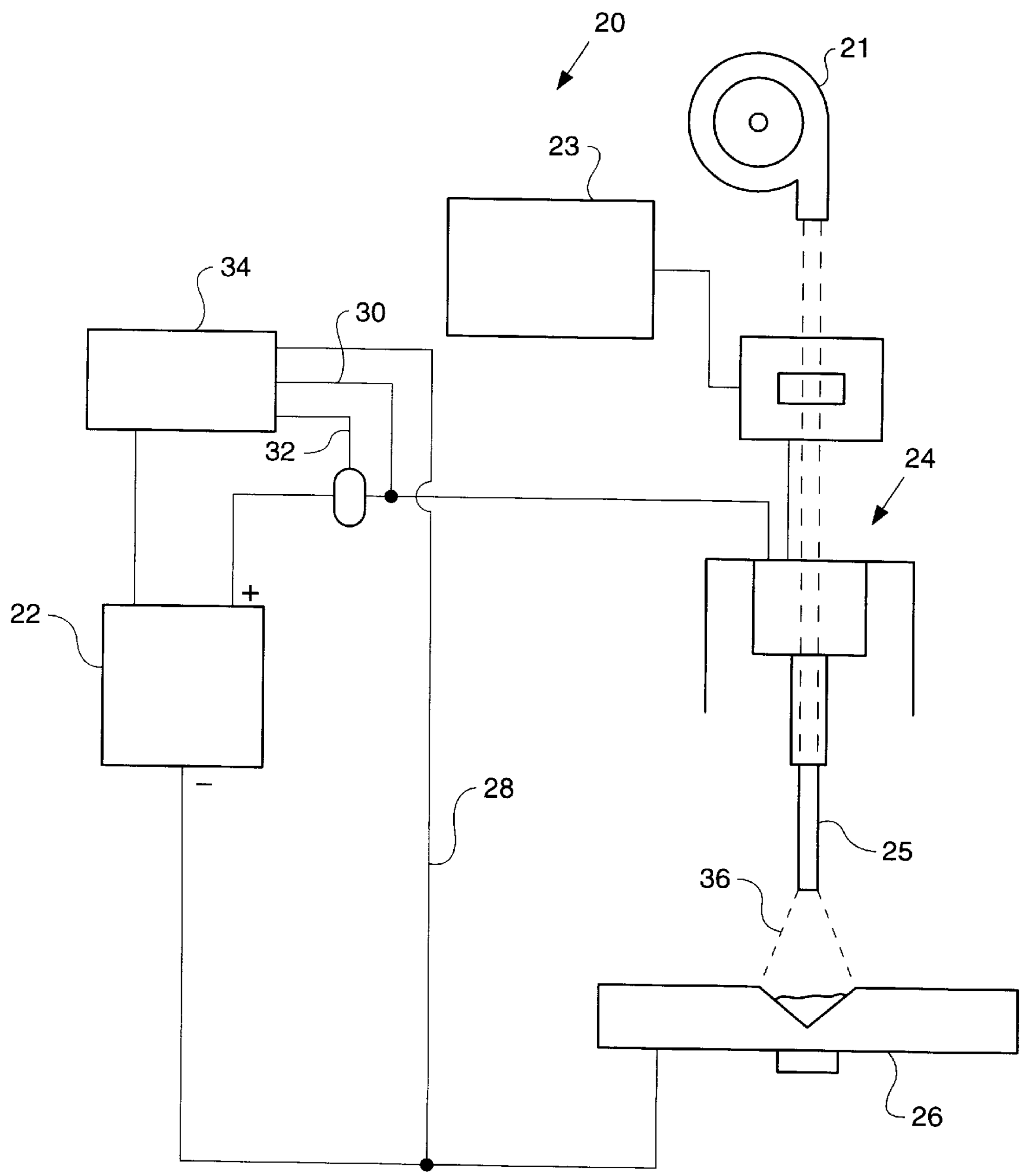
FIG. 1 is a data acquisition circuit in which welding parameter signals are sensed for a welding process according to the present invention.

Referring now to the drawings, and initially to FIG. 1, a conventional arc welding circuit is indicated by numeral 20. This conventional arc welding circuit 20 includes a commercially available welding power source 22, a weld gun 24 and a base plate 26. Conventional voltage and current sensors in the form of leads 28 and 30 and a torrid core 32, respectively, detect variations in the voltage and current signals, preferably operating in a constant voltage mode, across the weld gun 24 as the welding power source 22 compensates for disturbances in the arc region 36 such as shielding gas contamination, weld pool interference, and excessive melt-through. The shielding gas is provided to the weld gun 24 by the shielding gas supply 23. Other sensors that can be utilized in a conventional arc welding circuit 20 to detect variations in the current and voltage and include, but are not limited to, Hall-effect transducers and precision current shunts.

Throughout this application, welding can include, but is not limited to, gas metal arc welding, submerged arc welding, and flux core welding.

In the specific preferred embodiment, an electronic controller 34 is utilized. The electronic controller 34 can include, but is not limited to, a processor such as a microprocessor, however, any of a wide variety of computing devices will suffice that can perform data acquisition. The electronic controller 34 preferably includes, but is not limited to, a memory device and a clock, and is representative of both floating point processors, and fixed point processors. The electronic controller 34 is used to sample the welding parameter signals and to analyze the data according to the particular algorithm employed, discussed hereinafter in greater detail. Electronic controller 34 can be equipped with a data acquisition board that has at least three analog inputs and two digital outputs. The signals are digitized by the data acquisition card and put into the memory (not shown) of the electronic controller 34. The quality state of the weld bead is determined based on processed welding parameter signals, such as, but not limited to current, voltage and wire feed speed signals.

Electronic controller 34 can be, but is not limited to, a conventional personal computer. The sampling rate of the conventional arc welding circuit 20 is dependent on the speed of electronic controller 34. Because of the speed of the electronic controller 34 and the resulting rates at which the information is processed and, also, the algorithms employed to detect the quality state of the weld bead, arc welding circuit 20 is capable of detecting a process fault before the level of defective welds becomes significant. For example, some of the defects that are directly detectable are porosity, excessive melt-through, and excessive contact tip to work. When any of these conditions are detected, the operator is alerted and/or the process is terminated.

The above-described sampling rates permit a decision regarding the quality state of the weld to be made at least one time per second. Although a decision rate of two Hertz is adequate for the specific preferred embodiment in which heavy sections are welded, the same approach can be applied on thin section weld assemblies by increasing the sampling rate and further reducing the time between control decisions. For one Hertz resolution utilizing a fast Fourier transform, you will need 256 samples per second with 256 input elements utilized. As a result and regardless of the particular weld section geometry, the present invention appraises the operator of the quality state of the weld and/or terminates the weld based on the real-time weld condition.

In general, disturbances in the arc region 36 cause instabilities in the welding parameter signals that can readily be sensed and detected by the electronic controller 34. For example, when the shielding gas is contaminated the surface energies of a molten drop on the end of the electrode, e.g. welding wire 25, can change. These changes cause the drop to grow larger than it normally would under normal shielding atmosphere conditions. The larger drop changes the arc length that in turn, has an effect on the resistance of the system. This causes instabilities in the welding parameter signals, e.g., current and voltage signals as the drops repeatedly form, grow, and detach in an irregular manner. These instabilities can be detected in the time domain current data under most conditions.

However, under welding conditions that call for relatively high voltages and therefore longer arcs, these instabilities are not readily resolvable in the time domain data. In these cases, the signals are better resolved in the frequency domain. Further, testing has shown that most of the instabilities can be measured in a frequency that can range from about 0 Hertz to about 500 Hertz with a preferred range from about 20 Hertz to about 100 Hertz.

There are also numerous electrical operating parameters. The welding current signal can range from about 0.1 Amperes to about 5,000 Amperes, with a preferred range from about 200 Amperes to about 600 Amperes. The welding voltage signal can range from about 1 to about 50 volts, with a preferred range from about 25 to about 38 volts. Some of the other physical parameters include a preferred wire diameter can range from about 0.513 millimeters (0.020 inches) to about 25.4 millimeters (1 inches), with a preferred wire diameter of about 1.154 millimeters (0.045 inches) to about 1.321 millimeters (0.052 inches). The electrode can take the form of welding wire 25 that is supplied to the weld gun 24 by means of an electric wire feed and speed measurement device 27 that can alter the wire feed speed through the electronic controller 34, however, with most systems the wire feed speed is typically inalterable. The contact tip to work distance can range from about slightly greater than zero millimeters (0 inches) to about 304.8 millimeters (12 inches), with a preferred contact tip to work distance in a range from about 10 millimeters (0.394 inches) to about 35 millimeters (1.378 inches) with a most preferred contact tip to work distance in a range from about 18 millimeters (0.709 inches) to about 20 millimeters (0.787 inches).

Wire feed speed can range from about 0.0254 meters (1 inch) to about 126.903 meters (5,000 inches) per minute, with a preferred range from about 1.269 meters (50 inches) to about 25.381 meters (1,000 inches) per minute. Shielding gas flow rate can range from about zero cubic meters (zero cubic feet) to about 127.23 cubic meters (500 cubic feet) per hour, with a preferred range from about 8.1 cubic meters (6.18 cubic feet) to about 16.54 cubic meters (65 cubic feet) per hour. As previously stated, the electrode can, but not necessarily, be in the form of welding wire.

The present invention permits classification of the welding quality into three states. Furthermore, this method responds very quickly to perturbations in the welding process. If the weld quality state is such that a poor weld may be produced, the operator is alerted; however, the weld is permitted to proceed. If the quality state is deemed poor, the weld is terminated before an excessive amount of poor quality weld is produced. The third state is that of a quality weld in which welding is allowed to continue.

The weld quality monitoring software will now be discussed with reference to FIG. 2 and FIG. 2A, which depicts a flowchart representative of the computer program instructions executed by the electronic controller 34, shown in FIG. 1. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number. As shown in FIG. 2, the program first measures a first welding parameter signal, e.g., current <210>. The software program will then determine an average area under the first welding parameter signal, e.g. current, between a first frequency and a second frequency for a first predetermined time interval that is updated every second predetermined time interval <220>. The interval between the first frequency and the second frequency can range from about 0 Hertz to about 500 Hertz with a preferred frequency range of about 20 Hertz to about 500 Hertz with a most preferred frequency range of about 20 Hertz to about 100 Hertz. The first predetermined time interval can range from about 0.1 seconds to about 120 seconds with a preferred time interval from about 20 to about 45 seconds with the most preferred time interval being 30 seconds. The second predetermined time interval can range from about 0.001 seconds to about 120 seconds with a preferred time interval from about 0.1 to about 1 second with the most preferred time interval being 0.5 seconds. The measurement of the area under the curve can occur utilizing a wide variety of analytical methods. Although a fast Fourier transform may be utilized, the preferred analytical tool for measuring area under a curve is the power spectral density calculation. The power spectral density calculation is the value of the Fourier transform that has been squared.

Concurrently with program step <210>, the software program measures a second welding parameter signal, e.g., voltage <230> and a third welding parameter signal, e.g., wire feed speed <240>. The software program will then determine an average value for the second welding parameter signal, e.g., voltage, and an average value for the third welding parameter signal, e.g., wire feed speed, for a third predetermined time interval that is updated every fourth predetermined time interval <250>. The third predetermined time interval can range from about 0.1 seconds to about 120 seconds with a preferred time interval from about 20 to about 45 seconds with the most preferred time interval being 30 seconds. The fourth predetermined time interval can range from about 0.001 seconds to about 120 seconds with a preferred time interval from about 0.1 to about 1 second with the most preferred time interval being 0.5 seconds.

The next program step is to compare the average value for the second welding parameter signal and the average value for the third welding parameter signal with average area limit values located in an preestablished array or matrix to determine an average area limit value by utilizing bilinear interpolation on the preestablished array or matrix. The average area limit values located in a preestablished array or matrix are established with empirical data <260>. Nonlinear regression may also be utilized instead of bilinear interpolation. Nonlinear regression may also be utilized instead of bilinear interpolation.

The next step in the software program <270> is to determine if the average area under the first welding parameter signal, e.g. current, between a first frequency and a second frequency, for the first predetermined time interval that is updated every second time interval, as computed in program step <220>, exceeds the average area limit value from the preestablished array or matrix, as determined in program step <260>, for a fifth predetermined time interval that is updated every sixth time interval. The fifth predetermined time interval can range from about 0.1 seconds to about 120 seconds with a preferred time interval from about 20 to about 45 seconds with the most preferred time interval being 30 seconds. The sixth predetermined time interval can range from about 0.001 seconds to about 120 seconds with a preferred time interval from about 0.1 to about 1 second with the most preferred time interval being 0.5 seconds.

If the result of the analysis in program step <270> is affirmative, an indicator is set to one (1) <290> and if the result of the analysis in program step <270> is negative, an indicator is set to zero (0) <280>.

The next step in the software program is to sum the value of the indicators for a seventh predetermined time interval that is updated every eighth predetermined time interval <300>. The seventh predetermined time interval can range from about 0.1 seconds to about 120 seconds with a preferred time interval from about 20 to about 45 seconds with the most preferred time interval being 30 seconds. The eighth predetermined time interval can range from about 0.001 seconds to about 120 seconds with a preferred time interval from about 0.1 to about 1 second with the most preferred time interval being 0.5 seconds.

The next program step involves a determination of whether the summed value of the indicators exceeds a predetermined maximum value <310>. The maximum indicator value can vary depending on the duration of the welding process and the desired quality of the weld bead. Preferably, however, it is a fixed value that is dependent on the voltage. As a nonlimiting example, if the voltage is over 30 volts, the indicator, equals 40 and if the voltage is less than 30 volts, the indicator equals 50. If the result of the analysis in program step <310> is affirmative, the welding process is ceased <320> and if the result of the analysis in program step <310> is negative, the welding process is allowed to continue <330>. Any of the welding parameter signals can be substituted for any other with this invention and the examples given are merely preferences.

Figure 3:
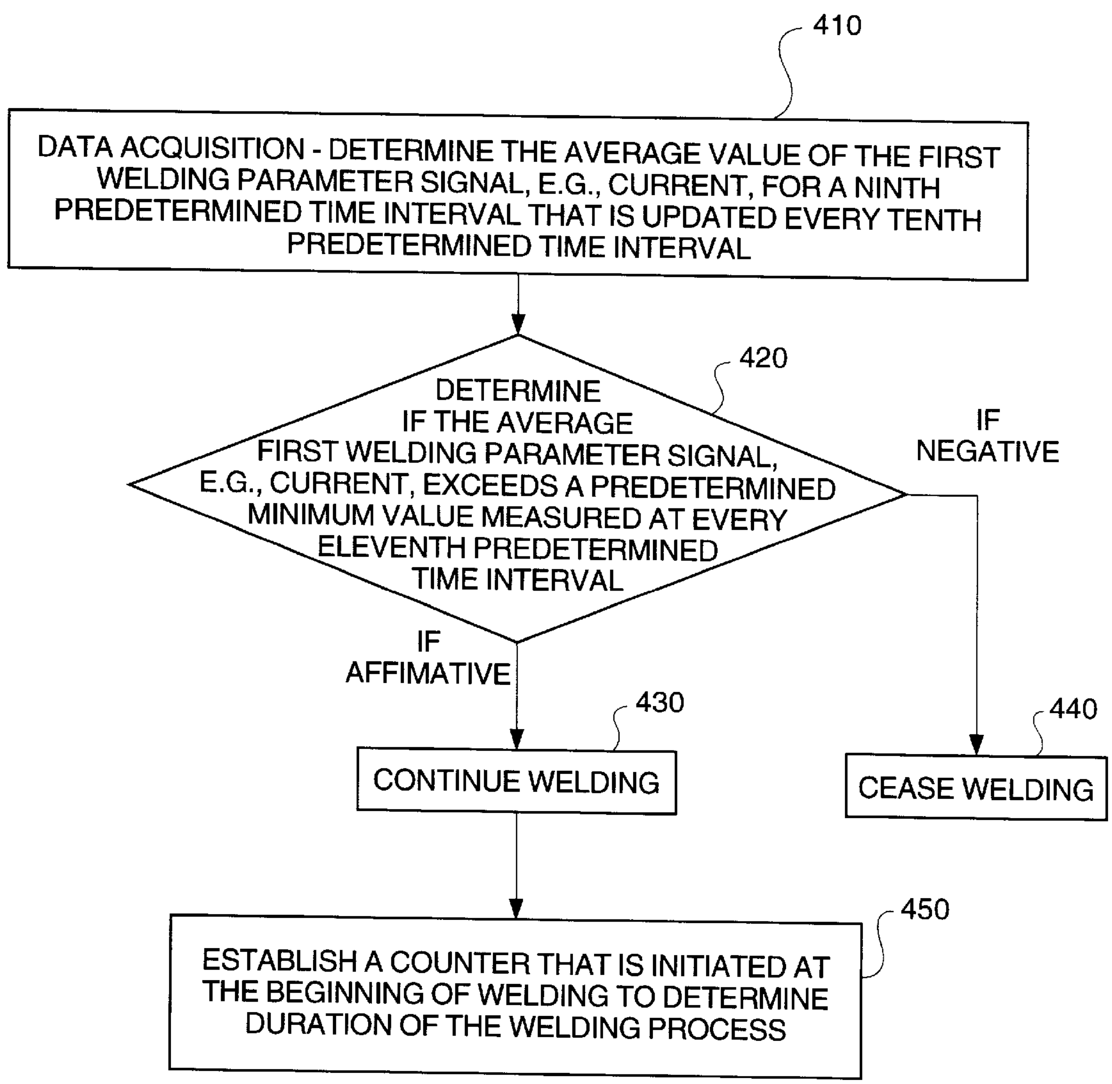
FIG. 3 is an algorithm for determining an average welding parameter signal, e.g., current, for a predetermined period of time that is continually updated in conjunction with a counter for measuring duration of a welding process.

Referring now to FIG. 3, wherein FIG. 3 describes another welding quality process. The first program step is to measure the first welding parameter signal, e.g., current and then determine the average value of the first welding parameter signal, e.g., current, for a ninth predetermined time interval that is updated every tenth predetermined time interval <410>. The ninth predetermined time interval can range from about 0.1 seconds to about 120 seconds with a preferred time interval from about 20 to about 45 seconds with the most preferred time interval being 30 seconds. The tenth predetermined time interval can range from about 0.001 seconds to about 120 seconds with a preferred time interval from about 0.1 to about 1 second with the most preferred time interval being 0.5 seconds.

The next program step is a determination if the average first welding parameter signal, e.g., current determined in program step <410> exceeds a predetermined minimum value measured at every eleventh predetermined time interval <420>. The eleventh predetermined time interval can range from about 0.1 seconds to about 120 seconds with a preferred time interval from about 20 to about 45 seconds with the most preferred time interval being 30 seconds. If the first welding parameter signal happens to be current, then this signal can range from about 0.1 Amperes to about 5,000 Amperes, with a preferred range from about 200 Amperes to about 600 Amperes.

If the result of the determination is affirmative, then welding is continued <430>. If the result of the determination is negative, then welding is ceased <440>. When welding is initiated, a counter is started to determine the duration of the welding process <450>. This predetermined minimum value can vary tremendously from weld to weld so there is no universal preferred value.

Industrial Applicability

The present invention relates generally to methods for determining the quality of the weld bead by evaluating the area under the curve between a first and second frequency for welding parameter signals such as, but not limited to, current, voltage, and/or wire feed speed. By monitoring this information, a determination can be made as to whether or not defects are being formed in the weld and a decision can be made as to whether or not welding should continue.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims, wherein reference numerals are merely for-convenience and are not to be in any way limiting, the invention may be practiced otherwise than as specifically described.

Other aspects, objects and advantages of the present invention can be obtained from a study of the drawings, the disclosure and the appended claims.

What is claimed is:

1. A method for monitoring quality of a weld bead during a welding process utilizing an electronic controller, comprising the steps of:

determining an average power spectral density value for a first welding parameter signal between a first predetermined frequency and a second predetermined frequency;

determining an average power spectral density value for a second welding parameter signal between a first predetermined frequency and a second predetermined frequency; and comparing said average power spectral density value for said second welding parameter signal with said average power spectral density value for said first welding parameter signal and terminating said welding process if said average power spectral density value for said first welding parameter signal exceeds said average power spectral density value for said second welding parameter signal.

2. The method, as set forth in claim 1, wherein said first welding parameter signal is selected from the group consisting of current, voltage and wire feed speed and said second welding parameter signal is selected from group consisting of current, voltage and wire feed speed.

3. A method for monitoring quality of a weld bead during a welding process utilizing an electronic controller, comprising the steps of:

determining an average area under a first welding parameter signal between a first predetermined frequency and a second predetermined frequency;

determining a combination average area limit value for both a second welding parameter signal and a third welding parameter signal; and comparing said combination average area limit value for both said second welding parameter signal and said third welding parameter signal with said average area under said first welding parameter signal and terminating said welding process if said average area under said first welding parameter signal exceeds said combination average area limit value for both said second welding parameter and said third welding parameter signal.

4. The method, as set forth in claim 3, wherein said step of determining said average area under said first welding parameter signal utilizes a Fourier transform calculation.

5. The method, as set forth in claim 3, wherein said step of determining said average area under said first welding parameter signal utilizes a power spectral density calculation.

6. The method, as set forth in claim 3, wherein said first welding parameter signal is selected from the group consisting of current, voltage and wire feed speed and said second welding parameter signal is selected from group consisting of current, voltage and wire feed speed and said third welding parameter signal is selected from group consisting of current, voltage and wire feed speed.

7. The method, as set forth in claim 3, wherein said step of determining a combination average area limit value for both said second welding parameter signal and said third welding parameter signal further includes the steps of:

determining an average value for the second welding parameter and an average value for the third welding parameter; and comparing said average value for the second welding parameter and said average value for the third welding parameter with preestablished average area limit values and determining a combination average area limit value.

8. The method, as set forth in claim 7, wherein said step of determining a combination average area limit value further includes utilizing bilinear interpolation on said pre-established average area limit values.

9. The method, as set forth in claim 7, wherein said step of determining a combination average area limit value further includes utilizing nonlinear regression on said pre-established average area limit values.

10. The method, as set forth in claim 7, wherein said preestablished average area limit values are located in an array.

11. The method, as set forth in claim 7, wherein said preestablished average area limit values are developed from empirical data.

12. A method for monitoring quality of a weld bead during a welding process utilizing an electronic controller, comprising the steps of:

determining an average area under a first welding parameter signal between a first predetermined frequency and a second predetermined frequency during a first predetermined time interval that is updated every second predetermined time interval;

determining a combination average area limit value for both a second welding parameter signal and a third welding parameter signal during a third predetermined time interval that is updated every fourth predetermined time interval; and comparing said combination average area limit value for both said second welding parameter signal and said third welding parameter signal with said average area under said first welding parameter signal and terminating said welding process if said average area under said first welding parameter signal exceeds said combination average area limit value for both said second welding parameter signal and said third welding parameter signal for a fifth predetermined time interval that is updated every sixth predetermined time interval.

13. The method, as set forth in claim 12, wherein said first welding parameter signal is current and said second welding parameter signal is voltage and said third welding parameter signal is wire feed speed.

14. A method for monitoring quality of a weld bead during a welding process utilizing an electronic controller, comprising the steps of:

determining an average power spectral density value for a current signal between a first predetermined frequency and a second predetermined frequency during a first predetermined time interval that is updated every second predetermined time interval and determining an average value for a voltage signal and an average value for a wire feed speed signal during a third predetermined time interval that is updated every fourth predetermined time interval;

determining an average area limit value by comparing said average value for a voltage signal and said average value for a wire feed speed signal with average area limit values located in a preestablished array by utilizing bilinear interpolation; and comparing said average power spectral density value for said first welding parameter signal with said average area limit value and terminating said welding process if said average power spectral density value of said current signal exceeds said average area limit value for a fifth predetermined time interval that is updated every sixth predetermined time interval.

15. A method for monitoring quality of a weld bead during a welding process utilizing an electronic controller, comprising the steps of:

determining an average power spectral density value for a current signal between a first predetermined frequency and a second predetermined frequency during a first predetermined time interval that is updated every second predetermined time interval and determining an average value for a voltage signal and an average value for a wire feed speed signal during a third predetermined time interval that is updated every fourth predetermined time interval;

determining an average area limit value by comparing said average value for a voltage signal and said average value for a wire feed speed signal with average area limit values located in a preestablished array by utilizing nonlinear regression; and comparing said average power spectral density value for said first welding parameter signal with said average area limit value and terminating said welding process if said average power spectral density value of said current signal exceeds said average area limit value for a fifth predetermined time interval that is updated every sixth predetermined time interval.

16. A method for monitoring quality of a weld bead during a welding process utilizing an electronic controller, comprising the steps of:

determining an average power spectral density value for a current signal between a first predetermined frequency and a second predetermined frequency during a first predetermined time interval that is updated every second predetermined time interval and determining an average value for a voltage signal and an average value for a wire feed speed signal during a third predetermined time interval that is updated every fourth predetermined time interval;

determining an average area limit value by comparing said average value for a voltage signal and an average value for a wire feed speed signal with average area limit values located in a preestablished array by utilizing bilinear interpolation;

comparing said average power spectral density value for said first welding parameter signal with said average area limit value and setting an indicator equal to one if said average power spectral density value of said current signal exceeds said average area limit value and setting an indicator to zero if said average limit value exceeds said average power spectral density value of said current signal for a fifth predetermined time interval that is updated every sixth predetermined time interval;

summing a value of said indicators for a seventh predetermined time interval that is updated every eighth predetermined time interval; and terminating said welding process if said summation of said indicators exceeds a predetermined maximum value.

17. An apparatus for monitoring quality of a weld bead during a welding process comprising:

an electronic controller for receiving a first welding parameter signal and a second welding parameter signal and then determining an average power spectral density value for said first welding parameter signal between a first predetermined frequency and a second predetermined frequency and determining an average power spectral density value for said second welding parameter signal area between a first predetermined frequency and a second predetermined frequency and then comparing said average power spectral density value for said second welding parameter signal with said average power spectral density value for said first welding parameter signal and terminating said welding process if said average power spectral density value for said first welding parameter signal exceeds said average power spectral density value for said second welding parameter signal.

18. The apparatus, as set forth in claim 17, wherein said first welding parameter signal is selected from the group consisting of current, voltage and wire feed speed and said second welding parameter signal is selected from group consisting of current, voltage and wire feed speed.

19. An apparatus for monitoring quality of a weld bead during a welding process comprising:

an electronic controller for receiving a first welding parameter signal, a second welding parameter signal, and a third welding parameter signal and then determining an average area under a first welding parameter signal between a first predetermined frequency and a second predetermined frequency and determining a combination average area limit for both a second welding parameter signal and a third welding parameter signal and then comparing said combination average area limit for both said second welding parameter signal and said third welding parameter signal with said average area under said first welding parameter signal and terminating said welding process if said average area under said first welding parameter signal exceeds said combination average area limit for both said second welding parameter signal and said third welding parameter signal.

20. The apparatus, as set forth in claim 19, wherein said electronic controller utilizes a Fourier transform calculation for determining said average area under said first welding parameter signal.

21. The apparatus, as set forth in claim 19, wherein said electronic controller utilizes a power spectral density calculation for determining said average area under said first welding parameter signal.

22. The apparatus, as set forth in claim 19, wherein said first welding parameter signal is selected from the group consisting of current, voltage and wire feed speed and said second welding parameter signal is selected from group consisting of current, voltage and wire feed speed and said third welding parameter signal is selected from group consisting of current, voltage and wire feed speed.

23. The apparatus, as set forth in claim 19, wherein said electronic controller determines an average value for the second welding parameter and an average value for the third welding parameter and compares said average value for the second welding parameter and said average value for the third welding parameter with preestablished average area limit values and develops a combination average area limit value.

24. The apparatus, as set forth in claim 23, wherein said electronic controller determines said combination average area limit value by utilizing bilinear interpolation on said preestablished average area limit values.

25. The apparatus, as set forth in claim 23, wherein said electronic controller determines said combination average area limit value by utilizing nonlinear regression on said preestablished average area limit values.

26. The apparatus, as set forth in claim 23, wherein said preestablished average area limit values are located in an array.

27. The apparatus, as set forth in claim 23, wherein said preestablished average area limit values are developed from empirical data.

28. An apparatus for monitoring quality of a weld bead during a welding process comprising:

an electronic controller for receiving a first welding parameter signal, a second welding parameter signal, and a third welding parameter signal and then determining an average area under a first welding parameter signal between a first predetermined frequency and a second predetermined frequency during a first predetermined time interval that is updated every second predetermined time interval and determining a combination average area limit value for both a second welding parameter signal and a third welding parameter signal during a third predetermined time interval that is updated every fourth predetermined time interval and then comparing said combination average area limit value for both said second welding parameter signal and said third welding parameter signal with said average area under said first welding parameter signal and terminating said welding process if said average area under said first welding parameter signal exceeds said combination average area limit value for both said second welding parameter signal and said third welding parameter signal for a fifth predetermined time interval that is updated every sixth predetermined time interval.

29. The apparatus, as set forth in claim 28, wherein said wherein said first welding parameter signal is current and said second welding parameter signal is voltage and said third welding parameter signal is wire feed speed.

30. An apparatus, for monitoring quality of a weld bead during a welding process, comprising:

an electronic controller for receiving a current signal, a voltage signal and a wire feed speed signal and then determining an average power spectral density value for a current signal between a first predetermined frequency and a second predetermined frequency during a first predetermined time interval that is updated every second predetermined time interval and determining an average value for a voltage signal and an average value for a wire feed speed signal during a third predetermined time interval that is updated every fourth predetermined time interval and determining an average area limit value by comparing said average value for a voltage signal and said average value for a wire feed speed signal with average area limit values located in a preestablished array by utilizing bilinear interpolation and then comparing said average power spectral density value for said first welding parameter signal with said average area limit value and terminating said welding process if said average power spectral density value of said current signal exceeds said average area limit value for a fifth predetermined time interval that is updated every sixth predetermined time interval.

31. An apparatus, for monitoring quality of a weld bead during a welding process, comprising:

an electronic controller for receiving a current signal, a voltage signal and a wire feed speed signal and then determining an average power spectral density value for a current signal between a first predetermined frequency and a second predetermined frequency during a first predetermined time interval that is updated every second predetermined time interval and determining an average value for a voltage signal and an average value for a wire feed speed signal during a third predetermined time interval that is updated every fourth predetermined time interval and determining an average area limit value by comparing said average value for a voltage signal and said average value for a wire feed speed signal with average area limit values located in a preestablished array by utilizing nonlinear regression and then comparing said average power spectral density value for said first welding parameter signal with said average area limit value and terminating said welding process if said average power spectral density value of said current signal exceeds said average area limit value for a fifth predetermined time interval that is updated every sixth predetermined time interval.

32. An apparatus, for monitoring quality of a weld bead during a welding process, comprising:

an electronic controller for receiving a current signal, a voltage signal and a wire feed speed signal and then determining an average power spectral density value for a current signal between a first predetermined frequency and a second predetermined frequency during a first predetermined time interval that is updated every second predetermined time interval and determining an average value for a voltage signal and an average value for a wire feed speed signal during a third predetermined time interval that is updated every fourth predetermined time interval and determining an average area limit value by comparing said average value for a voltage signal and an average value for a wire feed speed signal with average area limit values located in a preestablished array by utilizing bilinear interpolation and then comparing said average power spectral density value for said first welding parameter signal with said average area limit value and setting an indicator equal to one if said average power spectral density value of said current signal exceeds said average area limit value and setting an indicator to zero if said average limit value exceeds said average power spectral density value of said current signal for a fifth predetermined time interval that is updated every sixth predetermined time interval and then summing a value of said indicators for a seventh predetermined time interval that is updated every eighth predetermined time interval and then terminating said welding process if said summation of said indicators exceeds a predetermined maximum value.

* * * * *